US012483882B2

United States Patent
Chen et al.

(10) Patent No.: US 12,483,882 B2
(45) Date of Patent: *Nov. 25, 2025

(54) TRANSFERRING APPLICATION DATA BETWEEN DEVICES

(71) Applicant: Google LLC, Mountain View, CA (US)

(72) Inventors: Vincent Wei-Kang Chen, San Jose, CA (US); Paul Lee, Palo Alto, CA (US); Gregory M. Hecht, Mountain View, CA (US); Erdi Chen, San Jose, CA (US); Jenny Chun-yi Chen, Mountain View, CA (US); Maria-Ines Carrera, Oakland, CA (US); Estelle Laure Myriam Comment, Paris (FR); Eric Chu, Los Altos, CA (US); Peter Jin Hong, San Francisco, CA (US); Christopher John Adams, Brooklyn, NY (US); Lucas Gill Dixon, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,240

(22) Filed: Jun. 10, 2024

(65) Prior Publication Data
US 2024/0334185 A1    Oct. 3, 2024

Related U.S. Application Data

(63) Continuation of application No. 18/079,851, filed on Dec. 12, 2022, now Pat. No. 12,010,509, which is a
(Continued)

(51) Int. Cl.
*H04W 12/04*    (2021.01)
*H04L 9/40*    (2022.01)
(Continued)

(52) U.S. Cl.
CPC ......... *H04W 12/04* (2013.01); *H04L 63/0823* (2013.01); *H04L 67/1095* (2013.01);
(Continued)

(58) Field of Classification Search
CPC ..... H04W 12/04; H04W 12/50; H04W 12/65; H04W 4/50; H04L 63/0823; H04L 67/1095; H04L 67/34
See application file for complete search history.

(56) References Cited

U.S. PATENT DOCUMENTS 6,671,757 B1    12/2003    Multer et al.
7,143,419 B2    11/2006    Fischer et al.
(Continued)

FOREIGN PATENT DOCUMENTS

EP    1942423 A1    7/2008
EP    2723005 A1    4/2014
WO    2011090527 A1    7/2011

OTHER PUBLICATIONS

"About Multipeer Connectivity," 2 pages, [Retrieved on May 7, 2014] Retrieved from URL: https://developer.apple.com/library/ios/documentation/MultipeerConnectivity/Reference/MultipeerConnectivityFramework/Introduction/Introduction.html.
(Continued)

*Primary Examiner* — Hee K Song
(74) *Attorney, Agent, or Firm* — Lowenstein Sandler LLP

(57) ABSTRACT

Methods, systems, and apparatus are described for transferring application data. In one aspect, a method includes causing, by a first component on a first device to establish a wireless connection with a second device; receiving, by the first component, first application data from the first application; receiving, by the first component, an indication that a user of the second device has approved a data transfer; and causing, by the first component, the first device to send the
(Continued)

first application data to the second component running on the second device using the wireless connection.

20 Claims, 6 Drawing Sheets

Related U.S. Application Data continuation of application No. 16/882,393, filed on May 22, 2020, now Pat. No. 11,528,602, which is a continuation of application No. 16/267,065, filed on Feb. 4, 2019, now Pat. No. 10,667,129, which is a continuation of application No. 15/836,005, filed on Dec. 8, 2017, now Pat. No. 10,200,859, which is a continuation of application No. 14/491,368, filed on Sep. 19, 2014, now Pat. No. 9,872,174.

(51) Int. Cl.
*H04L 67/00* (2022.01)
*H04L 67/1095* (2022.01)
*H04W 4/50* (2018.01)
*H04W 12/50* (2021.01)
*H04W 12/65* (2021.01)

(52) U.S. Cl.
CPC ............... *H04L 67/34* (2013.01); *H04W 4/50* (2018.02); *H04W 12/50* (2021.01); *H04W 12/65* (2021.01)

(56) References Cited

U.S. PATENT DOCUMENTS

| | | |
|---|---|---|
| 7,155,521 B2 | 12/2006 | Lahti et al. |
| 7,194,557 B1 | 3/2007 | Peacock |
| 7,653,744 B2 | 1/2010 | Kanefsky et al. |
| 7,656,849 B1 | 2/2010 | Evans |
| 7,693,949 B2 | 4/2010 | Peacock |
| 7,962,575 B2 | 6/2011 | Glatt et al. |
| 8,276,189 B2 | 9/2012 | Kumar et al. |
| 8,396,466 B2 | 3/2013 | Sharma et al. |
| 8,577,995 B2 | 11/2013 | Suryanarayana |
| 8,631,088 B2 | 1/2014 | Robbin et al. |
| 9,820,084 B2 | 11/2017 | Palin et al. |
| 9,826,556 B2 * | 11/2017 | Rhee ............... H04W 76/40 |
| 2002/0065939 A1 * | 5/2002 | Liu ............... G06F 1/1656 709/248 |
| 2003/0101329 A1 | 5/2003 | Lahti et al. |
| 2007/0014314 A1 | 1/2007 | O'Neil |
| 2007/0208782 A1 * | 9/2007 | Carter ............... G06F 8/65 |
| 2009/0031258 A1 | 1/2009 | Arrasvuori et al. |
| 2009/0111378 A1 | 4/2009 | Sheynman et al. |
| 2009/0198772 A1 | 8/2009 | Kim et al. |
| 2009/0227282 A1 | 9/2009 | Miyabayashi et al. |
| 2011/0106954 A1 | 5/2011 | Chatterjee et al. |
| 2011/0175822 A1 | 7/2011 | Poon et al. |
| 2011/0288932 A1 | 11/2011 | Marks et al. |
| 2012/0330887 A1 | 12/2012 | Young et al. |
| 2013/0086214 A1 | 4/2013 | Jung et al. |
| 2013/0195271 A1 | 8/2013 | Miyabayashi et al. |
| 2013/0219381 A1 | 8/2013 | Lovitt |
| 2013/0282564 A1 | 10/2013 | Sibbald |
| 2013/0324169 A1 | 12/2013 | Kamal et al. |
| 2014/0006954 A1 | 1/2014 | Raffa et al. |
| 2014/0064198 A1 | 3/2014 | Pan et al. |
| 2014/0104990 A1 | 4/2014 | Shim |
| 2014/0176436 A1 | 6/2014 | Raffa et al. |
| 2014/0325500 A1 | 10/2014 | Jang et al. |
| 2014/0362728 A1 | 12/2014 | Krochmal et al. |
| 2014/0370807 A1 | 12/2014 | Lei et al. |
| 2015/0026125 A1 | 1/2015 | Sharma |
| 2015/0082410 A1 | 3/2015 | Fitzgerald et al. |
| 2015/0141005 A1 | 5/2015 | Suryavanshi et al. |
| 2015/0148104 A1 | 5/2015 | Friedl et al. |
| 2015/0249656 A1 | 9/2015 | Wu |
| 2015/0327045 A1 | 11/2015 | Chang et al. |
| 2016/0088064 A1 | 3/2016 | Chen et al. |

OTHER PUBLICATIONS

Arye M., et al., "A Formally-Verified Migration Protocol For Mobile, Multi-Homed Hosts," 20th IEEE International Conference on Network Protocols (ICNP'12), 2012, 12 Pages.

Bonnington C., "This Little-Known iOS Feature Will Change the Way We Connect," Wired. com, Mar. 28, 2014, pp. 1-13, [Retrieved on May 7, 2014] Retrieved from URL: http://www.wired.com/2014/03/apple-multipeer-connectivity/.

Examination Report for Indian Patent Application No. 201647044257, mailed Jan. 23, 2020, 6 Pages.

Extended European Search Report for European Application No. 15842290.7, mailed Apr. 12, 2018, 8 Pages.

Extended European Search Report for European Application No. 15842318.6, mailed Jul. 12, 2018, 10 Pages.

Haggle: "Applications," Aug. 31, 2011, 2 Pages, [Retrieved on May 7, 2014] Retrieved from URL: https://code.google.com/p/haggle/wiki/Applications.

Haggle: "Photoshare," A Content Centric Network Architecture for Opportunistic Communication, Aug. 28, 2009, 3 Pages, [Retrieved on May 7, 2014] Retrieved from URL: https://code.google.com/p/haggle/wiki/PhotoShare.

International Preliminary Report on Patentability for International Application No. PCT/US2015/050863, mailed Mar. 30, 2017, 9 Pages.

International Search Report and Written Opinion for International Application No. PCT/US2015/050624, mailed Mar. 18, 2016, 10 Pages.

International Search Report and Written Opinion for International Application No. PCT/US2015/050863, mailed Mar. 18, 2016, 12 Pages.

Li C., "Startup of the Week: Shoutr Lets You Share Files Without Internet-Even on the Moon," Berlin Web Week, 2014, 4 Pages, [Retrieved on May 7, 2014] Retrieved from URL: http://venturevillage.eu/shoutr.

Megamattron: "SplinterNet," GitHub.com, Feb. 26, 2013, pp. 1-3, [Retrieved on May 7, 2014] Retrieved from URL: https://github.com/megamattron/SplinterNet.

Nations D., What is AirDrop? How Does it Work?, About.com, 1 Page [Retrieved on May 7, 2014] Retrieved from URL: http://ipad.about.com/od/iPad-Guide/ss/What-Is-Airdrop-How-Does-It-Work.html.

Nordstorm E., et al., "Serval: An End-Host Stack for Services-Centric Networking," Appeared in 9th Usenix Symposium on Networked Systems Design and Implementation (NSDI'12), 2012, 4 Pages.

Nordstorm E., et al., "Haggle: Relevance-Aware Content Sharing for Mobile Devices Using Search," Computer Science, 2011, pp. 1-14, [Retrieved on May 7, 2014] Retrieved from URL: http://user.it.uu.se/erikn/papers/haggle-arch.pdf.

Openmesh: "B.A.T.M.A.N. Advanced Documentation Overview," 1 Page, [Retrieved on May 7, 2014] Retrieved from URL: http://www.open-mesh.org/projects/batman-adv/wiki/Doc-overview.

Partial European Search Report for European Application No. 15842318.6, mailed Apr. 11, 2018, 11 Pages.

Partial European Search Report for European Application No. 22199076.5, mailed Jan. 18, 2023, 13 Pages.

Rexford J., et al., "Serval: Software Defined Service-Centric Networking," PowerPoint Presentation, serval-arch.org, 32 Pages, [Retrieved on May 7, 2014] Retrieved from: URL: http://www.serval-arch.org/docs/serval-ons12.pdf.

Serval Architecture: "FAQ," Serval Architecture,A Leap towards Next-Generation Service-Centric Networking, 2014, 2 Pages, [Retrieved on May 7, 2014] Retrieved from URL: http://www.serval-arch.org/aq/.

Shoutr: "What is Shoutr," Shoutr, Be Independent, pp. 1-6, [Retrieved on May 7, 2014] Retrieved from URL: http://shoutr.net/.

(56) References Cited

OTHER PUBLICATIONS

Theodoropuolos G., "Understanding Multipeer Connectivity Framework in iOS 7—Part 1," Feb. 13, 2014, 50 Pages, [Retrieved on May 7, 2014] Retrieved from URL: http://www.appcoda.com/intro-multipeer-connectivity-framework-ios-programming/.
Thompson M., "Multipeer Connectivity," NShipster (NS), Dec. 9, 2013, 11 Pages, [Retrieved on May 7, 2014] Retrieved from URL: http://nshipster.com/multipeer-connectivity/.
"Twimight for Twitter," Google.com, Apr. 29, 2014, 2 Pages, [Retrieved on May 7, 2014] Retrieved from URL: https://play.google.com/store/apps/details?id=ch.ethz.twimight.
"Twimight," Google.com, 1 Page, [Retrieved on May 7, 2014] Retrieved from URL: https://code.google.com/p/twimight/.

\* cited by examiner

TRANSFERRING APPLICATION DATA BETWEEN DEVICES

CROSS-REFERENCE TO RELATED APPLICATIONS

This application is a continuation application of co-pending U.S. patent application Ser. No. 18/079,851, filed Dec. 12, 2022, which is a continuation of U.S. application Ser. No. 16/882,393, filed May 22, 2020, now U.S. Pat. No. 11,528,602, which is a continuation application of U.S. patent application Ser. No. 16/267,065, filed Feb. 4, 2019, now U.S. Pat. No. 10,667,129, which is a continuation application of U.S. patent application Ser. No. 15/836,005, filed on Dec. 8, 2017, now U.S. Pat. No. 10,200,859, which is a continuation application of U.S. patent application Ser. No. 14/491,368 filed on Sep. 19, 2014, now issued as U.S. Pat. No. 9,872,174, each of which is incorporated herein by reference.

BACKGROUND

This specification relates to transferring application data between devices.

Computing devices, such as personal computers, tablet computers, and mobile phones, often have applications installed to perform a variety of functions, including productivity applications, background service applications, entertainment applications, and others. Many applications are developed by third parties that distribute applications and application data to user devices using server computers. For example, a user device may download and install an application from an application server for the application. The same application server or a different application server may provide application data, such as new application content and/or new application updates for the application. In order to keep applications and application content updated, user devices will often connect to a network, such as the Internet, to periodically obtain application data from third party servers.

SUMMARY

In general, one innovative aspect of the subject matter described in this specification can be embodied in methods that include the actions of causing, by a first service running on a first device, the first device to establish a wireless connection with a second device; receiving, from a second service running on the second device, data specifying applications that are installed on the second device and supported by the second service, each of the applications being separate from the second service; determining, by the first service, that a first application installed on the first device matches one of the applications installed on the second device, the first application being separate from the first service; receiving, by the first service, first application data from the first application; and causing, by the first service, the first device to send the first application data to the second service running on the second device using the wireless connection. Other embodiments of this aspect include corresponding systems, apparatus, and computer programs, configured to perform the actions of the methods, encoded on computer storage devices.

These and other embodiments can each optionally include one or more of the following features. A method may include: determining, by the first service, that a second application installed on the first device matches a second of the one or more applications installed on the second device, the second application being different from the first application; receiving, by the first service, second application data from the second application; and causing, by the first service, the first device to send the second application data to the second device using the wireless connection.

The method may comprise: causing, by the first service, the first device to broadcast wireless connection availability; and receiving a wireless connection request from the second device; and wherein the first service causes the first device to establish a wireless connection with the second device in response to receiving the wireless connection request from the second device.

Causing the first device to broadcast wireless connection availability may comprise: causing a speaker of the first device to emit an audio sample that specifies wireless connection data.

The wireless connection data may comprise: a service set identifier (SSID) for a wireless component of the first device; a password for connecting to the wireless component; and data identifying the first application.

The wireless connection data may comprise: a Bluetooth (IEEE 802.15.1) identifier for a Bluetooth component of the first device; and data identifying the first application.

The wireless connection data may comprise a public key for encrypting communications between the first device and the second device.

The first application data may be received by the first service through a first communications socket between the first application and the first service; and the first application data includes an identifier identifying the first application.

The first service may cause the first device to broadcast wireless connection availability in response to receiving first gesture input; the wireless connection request may include a second gesture input; and the first service may cause the first device to establish a wireless connection with the second device only in response to determining that the second gesture matches the first gesture.

The first device may include one or more physical sensors for sensing physical motion of the first device; and the first gesture may be a physical gesture interpreted by the one or more physical sensors.

The first device may include one or more touch sensors for sensing tactile input on a touch-sensitive screen; and the first gesture may be a pattern interpreted by the one or more touch sensors.

In general, another aspect of the subject matter described in this specification can be embodied in methods that include the actions of receiving, at a first device, wireless data indicating that a wireless connection is available, the wireless data specifying an identifier for a second device; causing, by a first service running on the first device, the first device to establish a wireless connection with the second device; receiving, from a second service running on the second device, data specifying applications that are installed on the second device and supported by the second service, each of the applications being separate from the second service; determining, by the first service, that a first application installed on the first device matches one of the applications installed on the second device, the first application being separate from the first service; causing, by the first service, the first device to send a first request to the second service for first application data from a matching application that matches the first application; receiving, by the first service and from the second service, the first application data for the first application; and providing the first application data to the first application. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Transferring application data between user devices enables sharing of content and other data without the need for a connection to a local area network or wide area network. User devices that are not capable of communicating with a third party application server may obtain application data from another user device. User devices may be able to communicate faster and/or in a more reliable and/or secure manner between each other than over a separate network connection, leading to application data being transferred faster, more securely, and/or more reliably than it may otherwise be transferred. Using a service that supports multiple applications allows application developers to configure applications to share application data using the separate service. In addition, network traffic for network providers, such as Internet service providers and cellular network providers, may be reduced when user devices obtain application data from one another rather than across network providers' networks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A synchronization (sync) service facilitates the transfer of data between user devices, such as mobile phones, personal computers, and tablet computers. User devices may run applications that are periodically updated, e.g., by the user device on which they are installed and/or via a third party application server accessible via the internet. A sync service running on user devices allows the user devices to transfer application specific data between matching applications installed on the user devices without the need to connect with a third party application server. The sync service can facilitate this functionality for multiple different applications. For example, a first user device may have a news application installed on it that periodically receives new news articles from a third party application server accessible via the Internet. A second user device that is not connected to the Internet may receive new news articles from the first user device using the sync service running on each device to facilitate the transfer of the articles from the first device to the second device.

By way of example, a sync service running on a first device may establish a wireless connection with a second device, e.g., using Bluetooth or a direct Wi-Fi connection. A sync service running on the second device may send the first device a list of applications that are installed on the second device and that are supported by the sync service. The sync service running on the first device can use the list of applications to determine if the first device has any matching applications installed. If so, the sync service may request application updates from the matching application(s). If the matching application(s) have data to share, they can send this information to the sync service on the first device, which will send it to the sync service on the second device, and the sync service on the second device will send the data to the respective matching applications on the second device. The sync service on the second device may also send application data to the first device if applications installed on the second device have data to provide.

These features and additional features are described in more detail below.

Example Operating Environment

Figure 1:
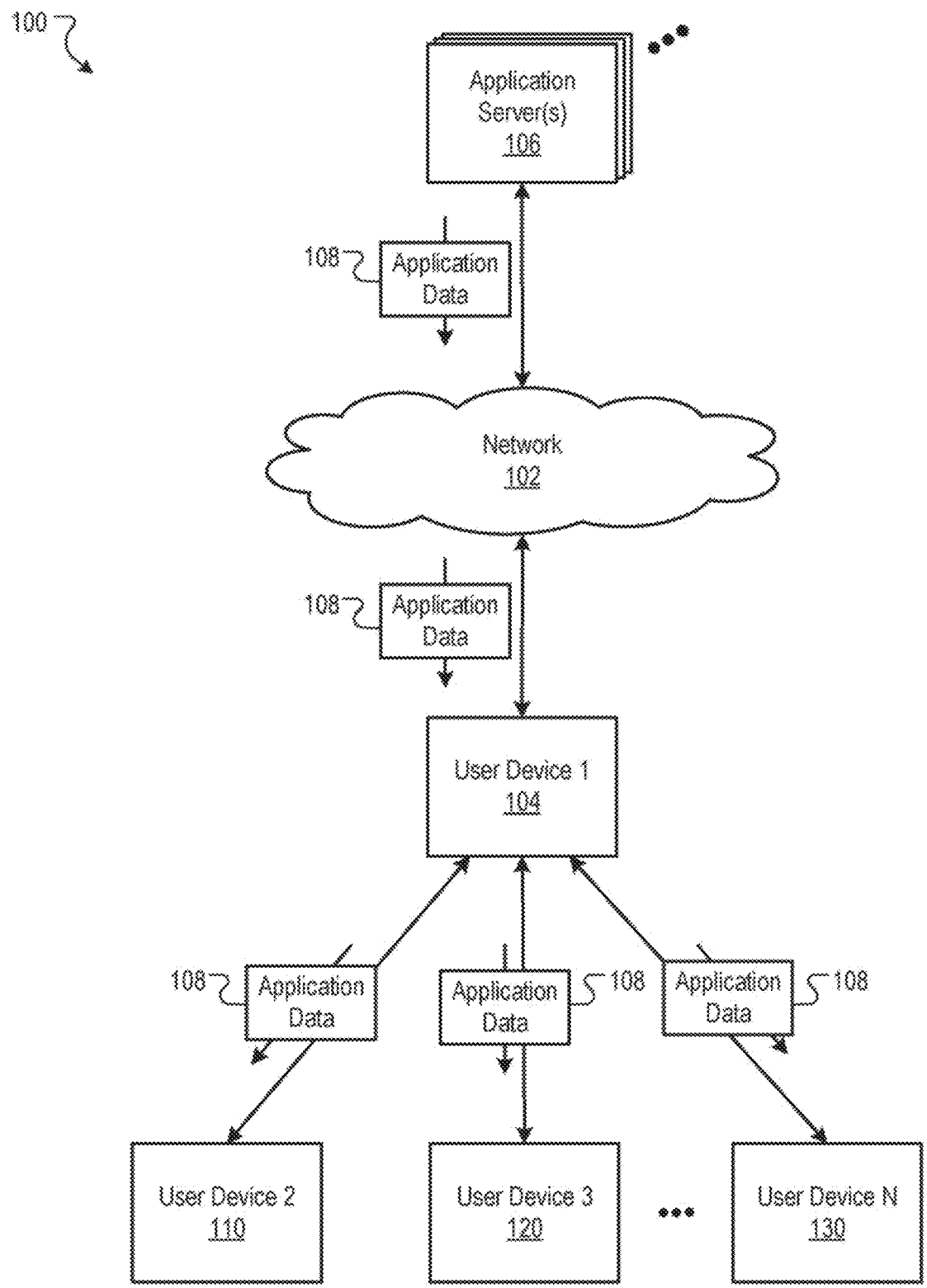
FIG. 1 is a block diagram of an example environment in which application data is transferred between devices.

FIG. 1 is a block diagram of an example environment 100 in which application data is transferred between devices. A computer network 102, such as a local area network (LAN), wide area network (WAN), the Internet, or a combination thereof, connects one or more user devices, such as user device 1 104, to one or more application servers 106. In the example environment, the user device 1 104 is in communication with user device 2 110, user device 3 120, and user device N 130.

Each user device is an electronic device capable of requesting and receiving data, e.g., over the network 102 or between user devices. Example user devices 104 include personal computers, mobile communication devices, tablet computers, and other devices that can send and receive data over the network 102 and/or directly to one another. User device 1 104 typically includes one or more applications that facilitate the sending and receiving of data over the network 102. For example, a news application running on user device 1 104 may request and receive electronic news articles from an application server for the news application, while word processing application may request and receive updates for the application from an application server for the word processing application.

An application server 106 is an electronic device capable of managing application data for one or more applications. Example application servers include personal computers, server computers, and other devices that can send and receive data over the network 102. An application server 106 typically includes one or more applications and storage devices used to manage application data. For example, an application server for a news application may store electronic news articles in a database and run an application that pushes new articles out to subscribing user devices connected to the application server over the network 102. As another example, an application server may store software updates for an application that can be provided to a user device upon request.

In the example environment, user devices 2-N are not connected to any of the application servers 106 over the network 102. They are, however, in communication with user device 1 104, e.g., via a wired or wireless connection. When an application server has new application data 108 to provide to user devices that are using a particular application, such as new content or an application update, user device 1 104 may receive the application data 108 from the application server using the network 102, e.g., the Internet. User devices 2-N, which are unable to get the application data 108 from the application server, may instead receive the application data 108 from user device 1 104.

Example Application Data Transfer

Figure 2:
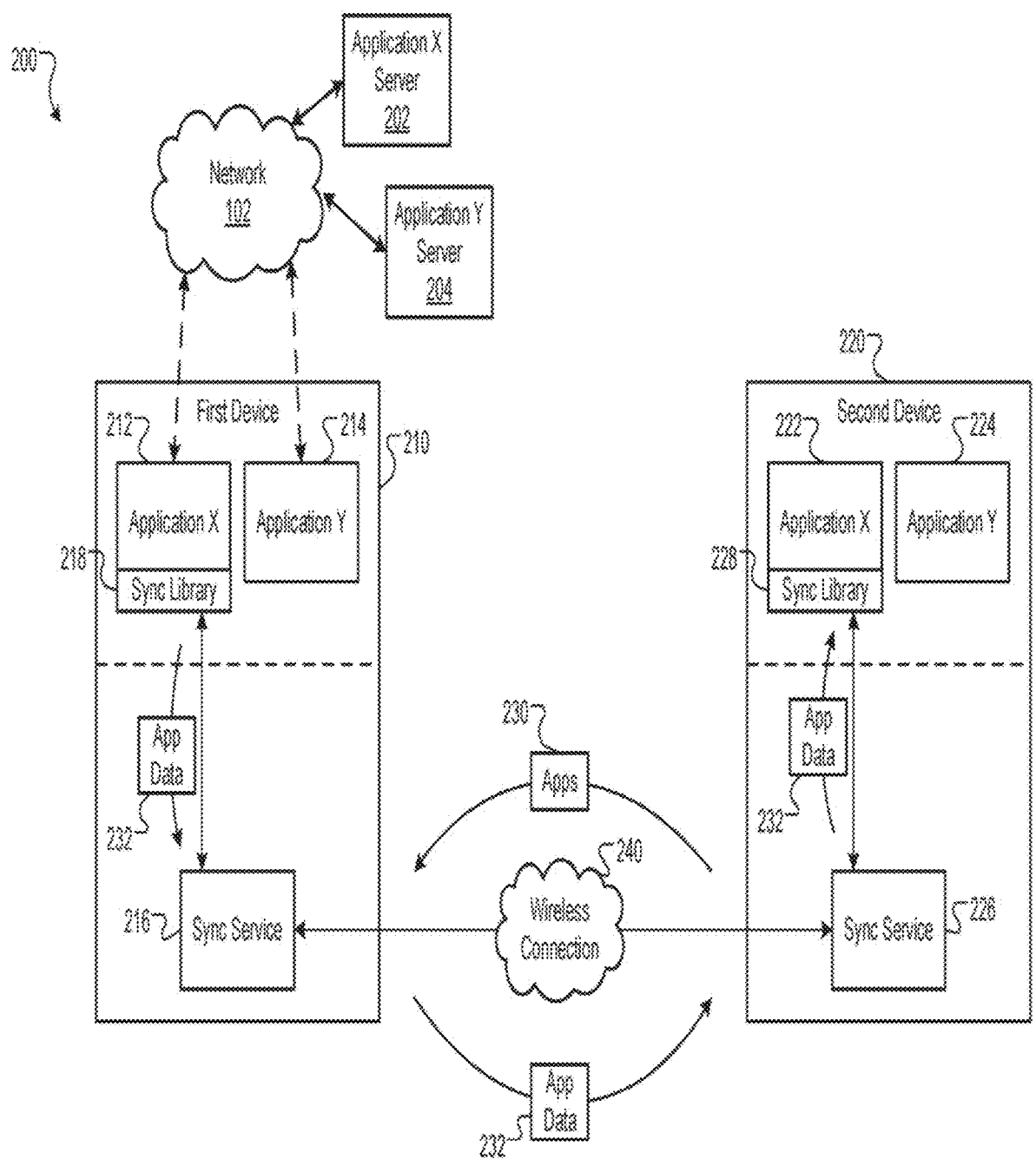
FIG. 2 is a data flow of an example process for transferring application data between devices.

FIG. 2 is a data flow of an example process 200 for transferring application data between devices. A first device 210 is connected to the network 102, e.g., the Internet. The first device may be, for example, a mobile phone or tablet computer. The first device 210 is depicted as having two applications installed on it, Application X 212 and Application Y 214. Application X 212 and Application Y 214 may periodically receive application ("app") data from their respective application servers, application X server 202 and application Y server 204. App data may include, for example, new content and/or updates for the respective applications, such as new articles for a news app, new music for a music app, new announcements and blog posts for a social media app, and updates for productivity apps, to name a few.

The first device 210 also includes a sync service 216, which is an application installed on the device that is used to facilitate synchronization of application data between user devices that also have the sync service 216 installed. The sync service 216 facilitates network communications between devices by abstracting the underlying physical network components and managing network connections. In some implementations, applications, such as application X 212, may use a sync library 218 to facilitate application data synchronization, e.g., application X 212 may statically link to a sync library that provides standard instructions used by the application for synchronization. The sync library 218 may provide an application with, for example: a mechanism for the application to receive commands and notifications from the sync service, with the ability to return results to the sync service; the ability to configure settings specific to the sync service and/or the application; and the ability for the application to initiate synchronization.

Connecting Devices

To transfer app data between devices, devices first connect to each other. Though devices may be capable of communicating with third party application servers without connecting to another device, e.g., using a cellular network connection or Wi-Fi connection to a broadband ISP, connecting devices directly to one another may be advantageous, for example, when other forms of communication may be slow, unreliable, or limited by a network service provider. Devices may be connected, or "paired," in a variety of ways, both wired and wireless. For example, the first device 210 may broadcast wireless availability, such as Bluetooth, Neighboring area Networking (NaN), Wi-Fi Hotspot, Ad-Hoc Wi-Fi, or Wi-Fi Direct availability. The broadcast may be initiated by a particular application, such as Application X 212, either automatically, based on a triggering event, or in response to a particular user interaction. The broadcast may also be initiated by the sync service 216, e.g., periodically, or in response to a triggering event or a user interaction. The broadcast may be a standard radio wave broadcast or, in some implementations, an audio broadcast, and it may include data identifying the broadcasting device and connection information, such as a network address of the device and/or a device identifier.

By way of example, the first device 210 may be placed into a broadcast mode that broadcasts Wi-Fi connection information via radio waves. The broadcast may also be in another form, e.g., a Bluetooth signal, audio signal, IR signal, etc. Other devices, such as the second device 220, may request to connect to the first device 210 automatically or based on user interaction. The request to connect may be accepted or rejected by the first device 210 automatically or upon user interaction, e.g., a user of the first device 210 may be prompted to accept a connection from the second device 220 when the first device 210 receives a connection request sent from the second device 220. In some implementations a user device placed in a broadcast mode may accept connection requests from known/trusted user devices, while prompting a user of the device to accept or deny connection requests from unknown/untrusted user devices.

As another example, the first device 210 may be placed into a listen mode, where the first device 210 listens for a connection request signal, such as an audio signal, Bluetooth signal, Wi-Fi signal, or IR signal, requesting a connection with the first device 210. For example, while the first device 210 is in a listen mode, the second device 220 may emit an audio signal that includes network and device information for connecting to the second device 220. The first device 210, upon receipt of the audio signal, may interpret the signal and accept or reject a connection with the second device 220 automatically or upon user interaction, e.g., the first device 210 may automatically accept a connection request from the second device 220 when the first device 210 determines that an audio signal identifying the second device 220 is from a trusted device in a whitelist of trusted devices known to the first device 210. In some implementations, the first device 210 may produce a second signal, such as an audio sample, to indicate to the second device 220 that the signal produced by the second device 220 was received by the first device 210. The second audio signal may include, for example, data indicating whether or not reception was successful and, if not, an error code to indicate potential problems preventing connection.

In some implementations, broadcast and connection requests may be initiated within an application supported by the sync service. For example, a news application may include a user interface element allowing a user to select among nearby devices with the same news application and the sync service installed. Selection of a nearby device may initiate a connection between devices for the purpose of transferring a particular news article. A device that receives a connection request or broadcast information from another device may present a user interface to a user of the device prompting the user for authorization to connect and/or transfer.

Other methods and variations for wireless discovery and connection between devices may be used. For example, the first device 210 may periodically emit an audio signal that can be picked up by other devices that are in a listen mode, and the audio signal may cause other devices to broadcast wireless connection information, such as a Bluetooth or Wi-Fi direct network address. In some implementations, multiple devices may be connected to each other at one time. For example, the first device 210 may be connected to multiple other user devices, and the connections may be any combination of wired, Bluetooth, Neighboring area Networking (NaN), Wi-Fi Hotspot, Ad-Hoc Wi-Fi, and/or Wi-Fi Direct.

As noted above, in some implementations triggering events may be used to initiate availability broadcast, listen mode, and device connections. For example, the first device 210 may use a location based trigger that causes the first device 210 to start broadcasting connection availability when the first device 210 detects that it is within a certain location, e.g., detected via GPS, or based on connection to a particular cellular network tower or Wi-Fi router. In some implementations, a trigger may be based on receipt of new application data from an application server. For example, when application X 212 receives app data from application X server 202, application X 212 may cause the sync service 216 to initiate an availability broadcast.

In some implementations, devices may be configured to periodically broadcast availability, e.g., every minute, every 20 minutes, every hour, etc. In some implementations, a trigger may be based on user input, e.g., interaction with a user interface or using motion or gesture based input. The triggering events provided above are examples, and other triggering events or combinations of triggering events may be used to initiate availability broadcasts, listen mode and device connections.

In some implementations, an availability broadcast and/or a connection request may include additional data. For example, the first device 210 may include a password with a service set identifier (SSID) for a wireless component of the first device 210 in an availability broadcast. As another example, a public key may be broadcast/transmitted for encrypting communications between user devices. In some implementations, a list of applications may be included with an availability broadcast and/or connection request, which enables the receiving device to determine if there are any matching applications on the receiving device. The list may include other information for the applications, such as information regarding available app data, e.g., application content and/or updates.

In some implementations, handshake data may be included in an availability broadcast and/or a connection request. Handshake data may include, for example, a password, a PIN number, and/or data specifying a tactile and/or physical gesture. For example, the first device 210 may include one or more physical sensors for sensing physical motion, such as gyroscopes and/or accelerometers, and handshake data may include physical sensor data that specifies a particular gesture, e.g., a "secret handshake" that must be substantially replicated by the second device 220 before the second device 220 is allowed to connect to the first device.

In situations where triggers are used, the occurrence of particular gestures or other handshake data may be used as a trigger. By way of example, the user of a mobile phone running a sync service may use a physical hand gesture while holding the phone to trigger the sync service's broadcast of connection availability. Another user with a second mobile phone may initiate a wireless connection with the first phone by making a similar physical hand gesture-one or both devices may transmit data specifying the physical hand gesture to the other, which can verify that the gesture matches within a certain measure of certainty before allowing the devices to wirelessly connect.

In some implementations, the wireless network used for wireless communications between user devices is a carrier network, such as a cellular telecommunications network. For example, an entire carrier network may be treated as a single logical network, enabling device discovery, pairing, and application sharing between any devices connected to the carrier network. Using the carrier network for transferring application data may relieve the carrier network of traffic, e.g., by allowing devices on the carrier network to obtain updates and application data from each other rather than third party servers that may require international communications.

In some implementations, the wireless network used for wireless communications between user devices is a wireless access point, such as a Wi-Fi router. Rather than devices connecting directly to one another, e.g., as in a Bluetooth or Wi-Fi direct connection, a wireless access point may be configured to allow discover and transfer using the access point. For example, a router may be configured to allow sync service communications between devices, or may be configured to run sync helper service that actively forwards communications between devices.

Transferring Application Data Between Devices

After user devices have connected to one another, application data may be transferred between them. In the example data flow 200, the first device 210 has established a wireless connection 240 with the second device 220. The sync service 216 running on the first device 210 receives, from the sync service 226 running on the second device 220, data identifying the apps 230 that are installed on the second device 220 and supported by the sync service 226. For example, the sync service 226 may send a list of apps 230 that includes application X 222 and application Y 224. The sync service 216 on the first device 210 determines whether any of the apps 230 are also installed on the first device 210. In the example data flow 200, application X and application Y are installed on both devices.

The manner in which a match is determined may vary. For example, an application may specify that only applications with an identical version number, or with a version number within a particular range, are matching. Another application may specify that any version of the application may be considered a match. In some implementations two different applications may be considered a match. For example, an application developer may have several different applications that are to be treated as matching applications, such as a free version of an application and a premium paid version of an application, or applications that look different but have the same underlying functionality. In these situations, the application developer may specify which application(s) will match, e.g., using the sync library.

After identifying matching applications, the sync service 216 running on the first device 210 receives app data 232 from application X 212. App data 232 may be transferred between application X 212 and the sync service 216 using a local communications socket. The app data 232 may be any data for application X 212, such as application content or a software update. For example, in a situation where application X 212 is a news application, the app data 232 may include several news articles that were most recently received from application X server 202 and/or a new version of application X 212. Each application may determine what to include in app data to be transferred.

In some implementations, the sync service 216 running on the first device 210 and/or the matching applications may determine which app data can be transferred based on information received from the second device 220. For example, the list of apps 230 sent to the sync service 216 may include, for each application, information indicating how up-to-date the application is. In this situation, the sync service 216 may provide the matching application X 212 with data indicating that the matching application on the second device 220 is up-to-date as of a particular time. Application X 212 may use the information, for example, to provide application updates or content that is more recent than the last time the corresponding application X 222 was updated. Using the news application example, if the most recent news article for application X 222 on the second device 220 is a week old, the matching application X 212 on the first device 210 can send app data 232 that includes every news article received from the application X server 202 within the past week. Information indicating how up-to-date an application is need not be included in the list of apps 230 and may be obtained in another manner, e.g., by specific requests originating from matching applications and/or the sync service.

After receiving the app data 232 from application x 212, the sync service 216 transmits the app data 232 to the sync service 226 on the second device 220 using the wireless connection 240. The sync service 226 determines which application the app data 232 is for, e.g., using an application identifier included in the app data 232, and sends the app data 232 to the matching application, application X 222. Application X 222 handles the app data 232 in a manner specified by the application, e.g., in the news application example, by presenting the news articles on a display of the second device 220.

In some implementations, the sync service is also eligible to receive and transfer app data for the sync service application. For example, an application server may provide updates to a user device that are for the sync service application. The sync service application may be able to transfer the updates to other devices using an older version of the sync service using the sync service. E.g., the first sync service 216 on the first device 210 may be more up-to-date than the sync service 226 on the second device 220, and the first sync service 216 may send app data to the second sync service 226 so that the second sync service 226 may be updated.

The first device 210 need not be in communication with the network 102 or any application servers to transfer app data 232. For example, the first device 210 may have been connected to the Internet and received application updates several hours or days before sending the application updates to the second device 220. In situations where the first device 210 is connected to both the network 102 and the second device 220 at the same time, app data received from application servers may be forwarded from the first device 210 to the second device 220 as they are received. For example, if application X server 202 provides a new article to application X 212 on the first device while the first device 210 is connected to the second device, application X 212 may send the new article to the matching application X 222 on the second device via the respective devices' sync services 216 and 226.

In some implementations, the second device 220 may be connected to the network 202 and, through the network 102, the application servers. Having a connection to the network 102 does not necessarily preclude the second device 220 from receiving app data from the first device 210. In situations where the connection speed between the second device 220 and the network 102 is slow and/or unreliable, for example, transfers between the devices may be desirable and continue.

While the example data flow 200 depicts the transfer of app data 232 from an application installed on the first device 210 a matching application on the second device 220, the wireless connection 240 between the devices may also be used for two-way communications, e.g., to send app data from an application on the second device 220 to a matching application on the first device 210. For example, application Y 224 on the second device 220 may be more up-to-date and/or have app data that the matching application, application Y 214 on the first device 210 doesn't have. As with application X 212, the sync service 226 on the second device 220 may receive app data from application Y 224 and transmit the app data to the sync service 216 running on the first device 210. The sync service 216 on the first device 210 may then forward the app data to application Y 214.

In some implementations, the sync service may support transferring data between applications that do not match. For example, the app data 232 received by the sync service 216 running on the first device 210 may be intended for application Y on the second device, instead of the matching application X 222. This may be useful, for example, if a developer of multiple applications has enabled the applications to handle similar application data. E.g., the developer of a social networking application and a textual communications application may allow textual communications sent through the social networking application to be received by the textual communications application.

In some implementations, the sync service supports the transfer of applications from one device to another. For example, in situations where the first device 210 has an application installed on it that the second device 220 does not have installed, the sync service 216 on the first device 210 may transfer the entire application to the second service 226 at the second device 220 for installation on the second device 220. In situations where the first device 210 has applications that are eligible for transferring to the second device 220, the sync service 216 may send data indicating eligible applications to the sync service 226 on the second device 220. Sending data indicating eligible applications may be performed by the sync service 216 in response to receiving a request for available applications from the sync service 226 running on the second device 220. After receiving the data indicating the eligible applications, the second device 220 may request a particular eligible application or applications to be transferred and installed on the second device 220, e.g., in response to selection, by the user of the second device 220, of eligible applications. For example, the sync service 226 on the second device 220 may cause the second device to display a prompt for a user of the second device, allowing the user to select which application(s) are available from the first device 210.

In some implementations, the app data 232 provided by the first device 210 to the second device 220 may originate locally, e.g., at application X 212 on the first device 210, rather than from application X server 202. By way of example, an image sharing application may have access to images captured and stored locally by the first device 210 as well as images provided by an application server. The local images may be provided as application data to a matching image sharing application on the second device 220, with or separately from the images provided by the application server.

In some implementations, the sync service prevents local application data from being transferred between devices, e.g., for security purposes. Using the image sharing application example, the sync service 216 on the first device 210 may prevent local images from being provided to the second device 220 and only allow images or other application data that was provided by application X server 202.

In some implementations, transferring app data between user devices is selectively authorized by a user of the user device. For example, if the sync service determines that the first device 210 has updates to send to the second device 220, the sync service may prompt the user for confirmation prior to sending the app data to the second device. Similarly, the sync service 226 running on the second device 220 may prompt a user of the second device 220 to accept transfer of app data, e.g., by prompting the user to accept app data from the first device 210 for a particular application. In some implementations, data transfer is handled in the background, e.g., without the need for user interaction. For example, certain applications may have authorization to transfer data automatically when connected to another device with a matching application. User preferences may be used to manage when a user is prompted for a transfer, and the preferences may be universal and/or application specific. Similarly, certain types of app data may be automatically transferred, while other types of app data may require specific authorization, unless otherwise specified in user preferences. For example, a user may specify that a particular application may automatically retrieve content for an application in the background without seeking user authorization, but that application updates shouldn't be automatically transferred without specific user authorization.

In some implementations, applications and/or types of app data may have a corresponding priority. Applications and app data having a higher priority may be transferred prior to app data with a lower priority. For example, user preferences for the sync service may specify that a news application should be updated before a social networking application or productivity application. As another example, an application may have preferences that specify that application updates should have a higher priority than application content. The priority of applications and/or app data may be determined by the sync service, with or without the use of user preferences or application specific preferences. In situations where multiple user devices are connected, user devices may also have a priority, e.g., based on user preferences, the amount of data to be transferred, etc.

While the example data flow 200 depicts two applications on each user device, user devices may have any number of applications, matching or not. Where app data is being transferred for multiple applications, the sync service on each device forwards app data to the appropriate application, e.g., as indicated in data packets sent wirelessly from the sync service 216 on the first device 210 to the sync service 226 on the second device 220.

While the example data flow 200 depicts two user devices, in some implementations many user devices may be connected to each other, e.g., in a many to one or many to many relationship. For example, the first decide 210 may be connected to five other user devices. The matching applications between the first device 210 and the other devices may be the same or different, and the sync service 216 may send app data to none or all of them, one at a time or at the same time, e.g., sending packets in a round robin manner until all user devices have received all app data.

Example User Interfaces

Figures 3A, 3B:
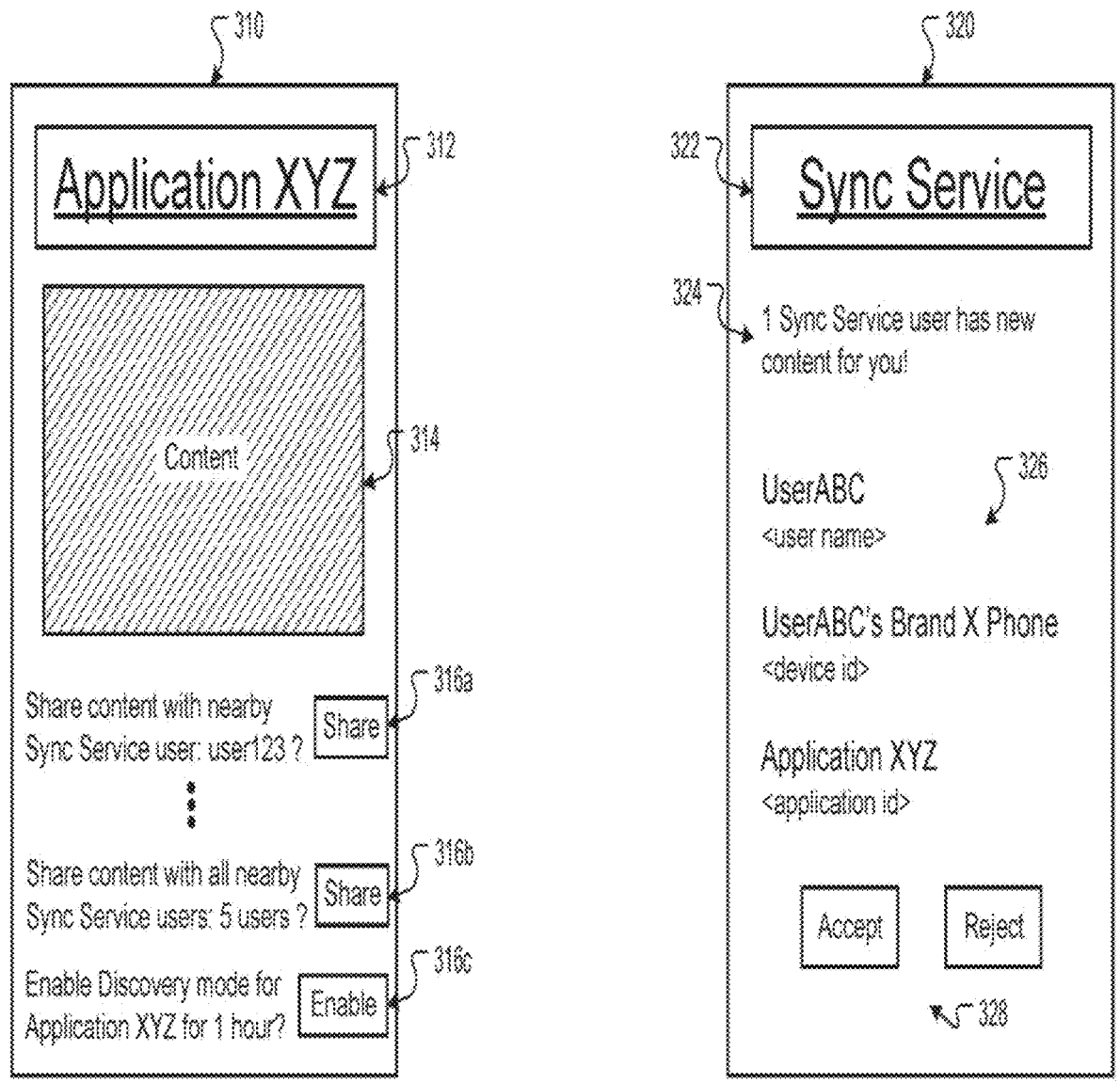
FIG. 3A is an illustration of an example application interface for transferring application data between devices.
FIG. 3B is an illustration of an example synchronization service interface for transferring application data between devices.

FIG. 3A is an illustration of an example application interface 310 for transferring application data between devices. The interface may be presented at a user device, such as a mobile phone, tablet computer, or personal computer. The example interface 310 depicts the name of an application 312, "Application XYZ," as well as application content 314 and user interface elements 316a, 316b, and 316c for initiating the transfer of the application content 314 to other user devices.

For example, the application may be an image sharing application that periodically receives popular images, e.g., the content 314, from a server device. User interface elements 316a-c allow a user of the device to select one or more users with nearby devices to transfer the content 314. For example, selecting element 316a may cause the user device to broadcast connection availability or accept a connection request from a user device associated with user 123, selecting element 316b may cause the user device to broadcast connection availability to all nearby users and/or to accept any connection requests from the five nearby users, and selecting element 316c may cause the user device to broadcast connection availability for the next hour, e.g., by broadcasting a Wi-Fi SSID and/or periodically broadcasting an audio signal including Bluetooth connection information.

FIG. 3B is an illustration of an example synchronization service interface 320 for transferring application data between devices. The interface may be presented at a user device, such as a mobile phone, tablet computer, or personal computer. The example interface 320 depicts the name of an application 322, "Sync Service," a message 324, user device connection information 326, and user interface elements 328 for initiating the transfer of application content to the user device.

For example, the interface 320 depicts information a user device may display in response to identifying a broadcasting user device or receiving a connection request. The sync service has provided the message "1 Sync Service user has new content for you!" This informs the user of the device that new app data is available. The user device connection information 326 includes information identifying other sync service user, "UserABC," an identifier for that user's user device, "UserABC's Brand X Phone," and the application(s) for which the other user device has new content to transfer, "Application XYZ." The user interface elements 328 allow the user of the user device to accept or reject a connection between devices. Accepting the request may initiate a wireless connection between the devices, while rejecting the request may cause the user device to ignore the request.

Other interfaces and other options and/or combinations of options may be provided in addition to those depicted in the example user interfaces 310 and 320.

Example Application Data Transfer Processes

Figure 4:
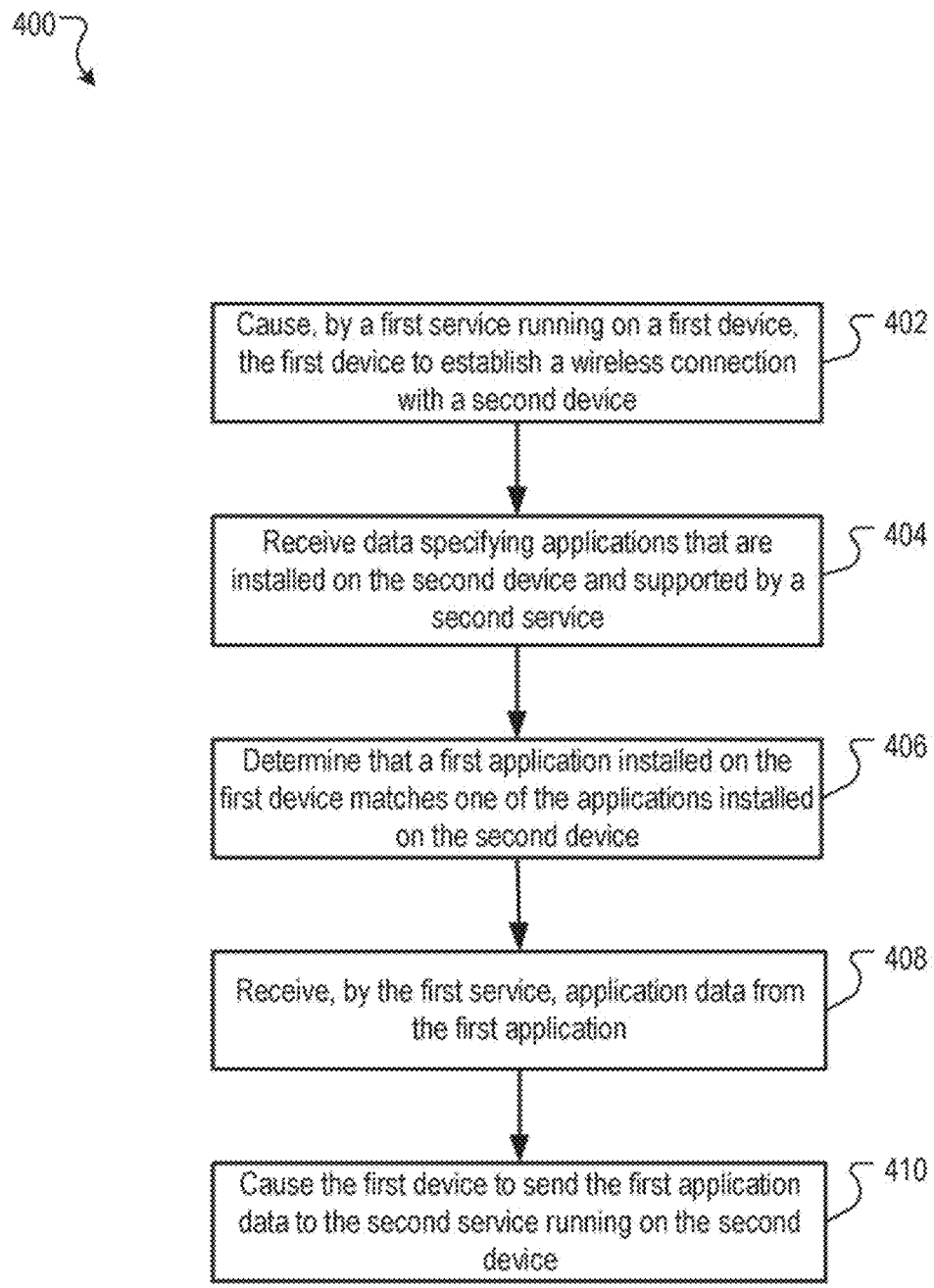
FIG. 4 is a flow diagram of an example process for transferring application data between devices.

FIG. 4 is a flow diagram of an example process 400 for transferring application data between devices. The process 400 may be performed by data processing apparatus, such as the user device described above with reference to FIG. 1.

A first service running on a first device causes the first device to establish a wireless connection with a second device (402). For example, a sync service running on a first device may cause the first device to establish a Wi-Fi or Bluetooth connection with a second device. In some implementations, the first service causes the first device to broadcast wireless connection availability. A wireless connection request from the second device may be received, and the wireless connection with the second device may be established in response to receipt of the wireless connection request.

For example, broadcasting wireless connection availability may include causing a speaker of the first device to emit an audio sample that specifies wireless connection data. The second user device may receive the audio sample through a microphone and interpret wireless communication information encoded in the audio sample. In some implementations, wireless connection data includes: a service set identifier (SSID) for a wireless component of the first device, a password for connecting to the wireless component, and data that identifies an application installed on the first device. In some implementations, the wireless connection data includes a Bluetooth (e.g., IEEE 802.15.1) identifier for a Bluetooth component of the first device and data identifying an application installed on the first device.

In some implementations, the wireless connection data includes a public key for encrypting communications between the first device and second device. For example, the sync service may be associated with an encryption key pair, and the public key may be provided to the second device with the wireless connection data.

In some implementations, the first service causes the first device to broadcast wireless connection availability in response to receiving first gesture input. For example, the first device may have one or more physical sensors for sensing physical motion of the first device, such as accelerometers and/or gyroscopes. In this situation the first gesture input may be a physical gesture that has been interpreted by the physical sensors. The sync service may match the physical gesture with a pre-recorded physical gesture and use the match to determine that the first device should broadcast wireless connection availability. The wireless connection request received from the second device may include a second gesture input. For example, a sync service running on the second device may transmit data representing a second physical gesture recorded using accelerometers and/or gyroscopes of the second device with the wireless connection request. In this situation, the first service may cause the first device to establish a wireless connection with the second device only in response to determining that the second gesture input matches the first gesture. For example, the sync service may attempt to match, within a certain measure of certainty, the two gestures based on the data representing the gestures, ensuring that a connection will only be established if the "handshake" from each device matches.

In some implementations, the first device has one or more touch sensors for sensing tactile input on a touch sensitive screen, such as capacitive or resistive screen. The first gesture input can be a pattern interpreted and/or recorded by the touch sensors. For example, a user may draw a shape or enter a PIN on a touch screen as a first gesture. As with a physical gesture used as a "handshake," the sync service may match the gesture with a pre-recorded pattern and use the match to determine that the first device should broadcast wireless connection availability. The wireless connection request received from the second device may include a second gesture input, such as data representing a second tactile input recorded using a touch screen of the second device. In a manner similar to that above, the first service may cause the first device to establish a wireless connection with the second device only in response to determining that the second gesture input matches the first gesture.

While gesture input is described above as being used to initiate a wireless connection, in some implementations it may be used for verification or authentication after a wireless connection is established by before initiating data transfer.

Data is received that specifies applications that are installed on the second device and supported by a second service running on the second device (404). For example, the second device may provide a single application or a list of applications that are included on the device and supported by the sync service. The second service running on the second device may cause the data to be sent to the first device, e.g., in response to receiving a connection request, in response to detecting wireless connection availability of the first device, and/or in response to receiving user input indicating the data specifying applications should be sent.

The first service determines that a first application installed on the first device matches one of the applications installed on the second device (406). The first application is separate from the first service. For example, an application that is supported by the sync service may be installed on both the first device and the second device. The first service may use the data provided by the second device to determine that both devices have the same application installed.

The first service receives first application data for the first application (408). The first application data may be provided by the first application. For example, the first service may provide data identifying a matching application to the first application on the first device. The first application may use the data to determine whether application data should be sent to the second device, e.g., if the data identifying the matching application specifies that the version of the application on the second device is out-dated, the first application may generate first application data that includes information the matching application can use to update itself. After determining first application data to be sent to the matching application, the first application may provide that data to the first service for transferring to the second device.

In some implementations, the first application data is received by the first service through a first communications socket between the first application and the first service, and the first application data may include an identifier that identifies the first application. For example, the first application data may be passed from the first application to the sync service using a network socket. The first application data identifies the first application, for example, so that the sync service running on the second device can determine which application to forward the data to.

The first service causes the first device to send the first application data to the second service running on the second device using the wireless connection (410). For example, the sync service on the first device may cause the first device to transmit data packets including the first application data to the second device over a Bluetooth or Wi-Fi connection. In some implementations, a corded connection may also be used, e.g., the first application data may be sent using a USB cable. As described in further detail below with reference to FIG. 5, the second service running on the second device may receive the application data and send it to the matching application installed on the second device.

While the process 400 is described as sending application data for a single application, in some implementations data transfer between multiple applications is possible. For example, the first service may determine that a second application installed on the first device matches a second application installed on the second device. The first service may receive second application data from the second application, and the first service may cause the first device to send the second application data to the second device using the wireless connection. As noted above, application data for multiple applications and/or multiple connected devices may be sent one at a time or near the same time, e.g., using round-robin data transfer to rotate the applications for which data is transferred and/or the devices to which the data is being transferred.

Figure 5:
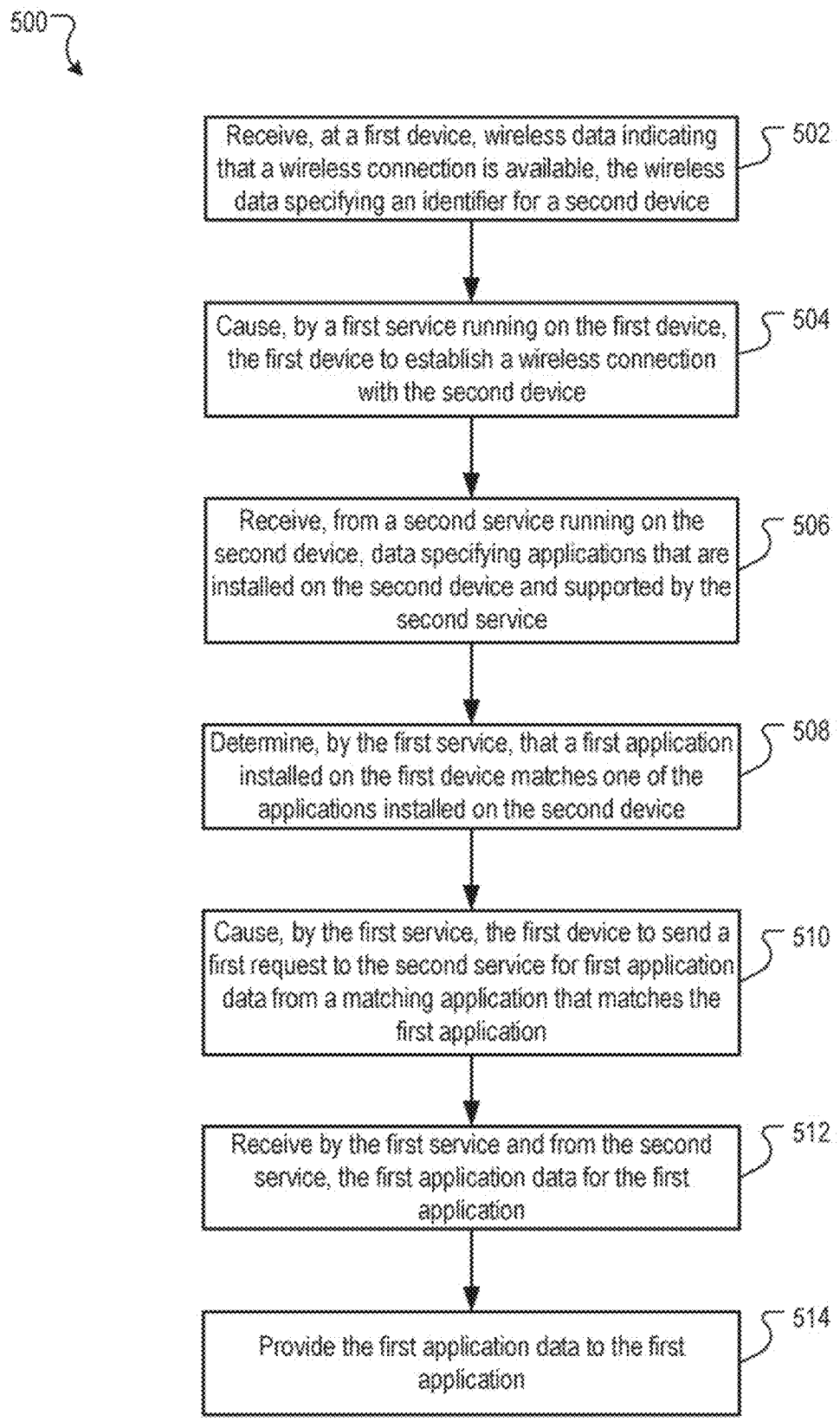
FIG. 5 is a flow diagram of an example process for receiving application data between devices.

FIG. 5 is a flow diagram of an example process 500 for receiving application data between devices. The process 500 may be performed by data processing apparatus, such as the user device described above with reference to FIG. 1.

Wireless data indicating that a wireless connection is available is received at a first device, and the wireless data specifies an identifier for a second device (502). For example, the first device may detect a Wi-Fi or Bluetooth signal emitted by the second device, or the first device may listen for an audio sample indicating that the second device is available for wireless communication.

A first service running on the first device causes the first device to establish a wireless connection with the second device (504). For example, the sync service running on the first device may instruct a network controller of the first device to connect to the second device, or to accept a connection request from the second device, in response to determining that the wireless data includes information specifying that the first device is running a sync service.

Data is received from a second service running on the second device, the data specifying applications that are installed on the second device and supported by the second service (506). For example, the second service may provide an identifier for an application, or a list of applications, installed on the second device. In some implementations the data also specifies other information, such as a version of the application, or a timestamp indicating how up-to-date the application is.

The first service determines that a first application installed on the first device matches one of the applications installed on the second device (508). The first application is separate from the first service. For example, the applications identified in a list of applications sent by the second device may be compared, by a sync service on the first device, to applications installed on the first device. The criteria used to determine if applications match may be configured by application developers, e.g., some may match only when version numbers of respective applications match or are within a specified range.

The first service causes the first device to send a first request to the second service for first application data from a matching application that matches the first application (510). For example, the first application, upon being provided with an indication that the sync service is connected to a device with a matching application, may instruct the sync service to request application data from the second device. The request sent to the second service may be for one or more matching applications, and may be for specific application data or a general request for application data.

The first service receives, from the second device, the first application data for the first application (512). The first application data may include, for example, specific data requested by the first application, or application data that the matching application on the second device selected for providing to the first application. As noted above, the application data itself may be for application content and/or updates for the application itself.

The first application data is provided to the first application (514). For example, the sync service running on the first device may identify the first application from data included in the application data, such as an identifier in the header of a network packet, and forward the first application data to the identified application using a network communications socket.

While the processes 400 and 500 described above with respect to FIGS. 4 and 5 are described as being performed via wireless communication, some or all of each process may be performed using a wired connection for communications between devices. In addition, a single user device may run a sync service that is capable of performing the functions of both processes 400 and 500 described above. Thus, the transfer of application data need not be one-way, and mutual sharing of application data may be performed between devices running sync services with matching applications.

Figure 6:
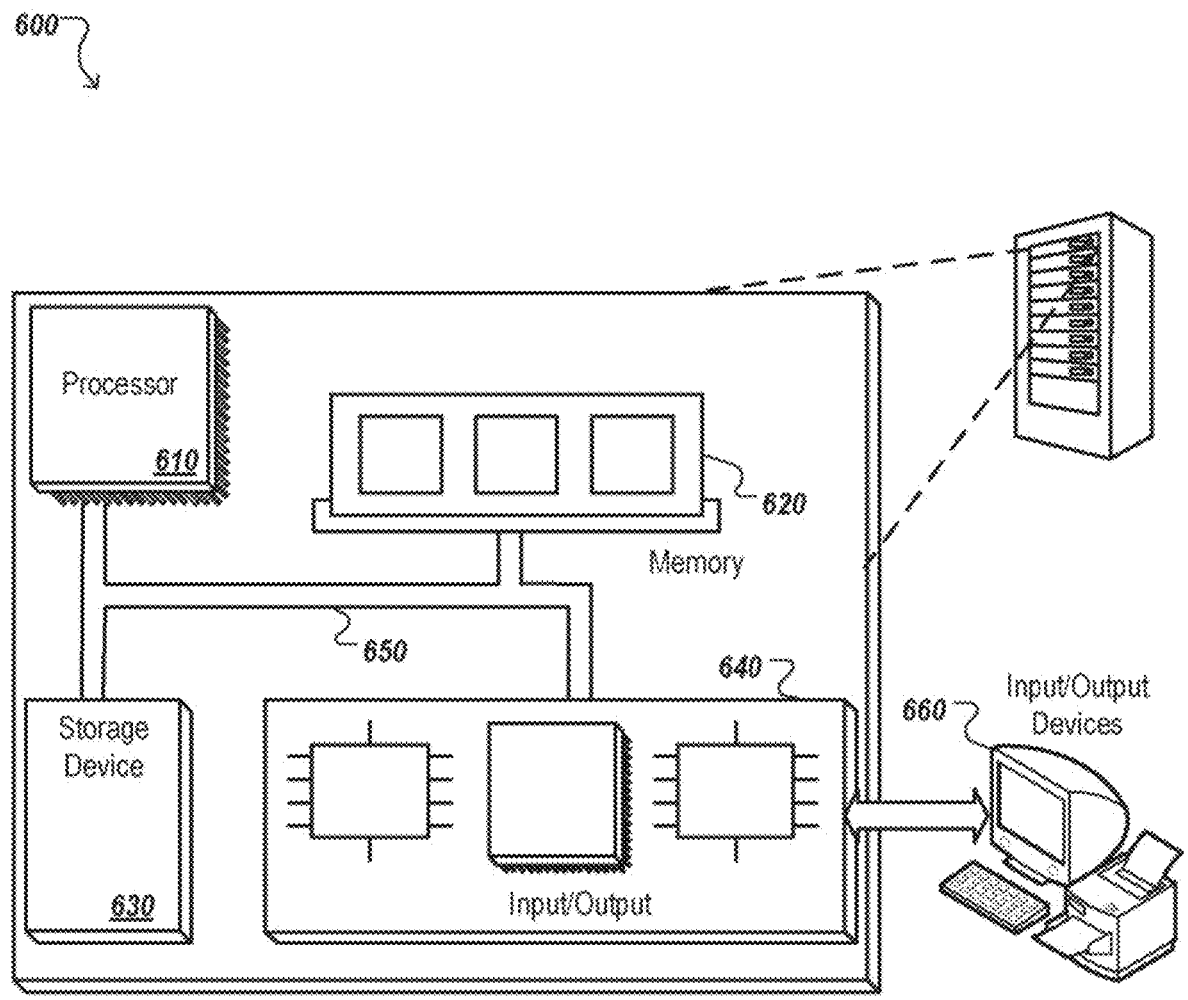
FIG. 6 is a block diagram of an example data processing apparatus.

FIG. 6 is a block diagram of an example data processing apparatus 600. The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television user devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer-implemented method, comprising:
   in response to a request of a first user of a first device to share first application data of a first application installed on the first device with a second device, causing, using a first component on the first device, the first device to establish a wireless connection with the second device, wherein the wireless connection is a connection that is separate from an Internet connection, wherein the first device is not communicating with the second device via the Internet connection, and wherein the second device has information about one or more applications that are installed on the second device and supported by a second component on the second device, each of the applications being separate from the second component and the first component;
   receiving, by the first component, the first application data from the first application, wherein the first application is separate from the first component and has the first application data to be shared;
   receiving, by the first component, an indication that a user of the second device has approved a data transfer; and
   causing, by the first component, the first device to send the first application data from the first application installed on the first device to the second component on the second device using the wireless connection.

2. The method of claim 1, wherein the second device is located nearby the first device.

3. The method of claim 1, further comprising:
   providing a user interface allowing the first user to select one or more second devices to share the first application data with.

4. The method of claim 1, wherein the first application data is to be used by a second application installed on the second device, wherein the second application corresponds to the first application.

5. The method of claim 1, further comprising:
   receiving, by the first component, second application data from a second application installed on the first device, the second application being different from the first application; and
   causing, by the first component, the first device to send the second application data to the second device using the wireless connection.

6. The method of claim 1, further comprising:
   causing, by the first component, the first device to broadcast wireless connection availability; and
   receiving a wireless connection request from the second device, wherein the first component causes the first device to establish the wireless connection with the second device in response to receiving the wireless connection request from the second device.

7. The method of claim 6, wherein the wireless connection availability comprises:
   a service set identifier (SSID) for a wireless component of the first device;
   a password for connecting to the wireless component; and
   data identifying the first application.

8. The method of claim 6, wherein the wireless connection availability comprises:
   a short range communication identifier for short range communication compliant component of the first device; and
   data identifying the first application.

9. The method of claim 6, wherein the wireless connection availability comprises a public key for encrypting communications between the first device and the second device.

10. The method of claim 1, wherein:
    the first application data is received by the first component through a first communications socket between the first application and the first component; and
    the first application data includes an identifier of the first application.

11. The method of claim 4, wherein the second application installed on the second device and the first application installed on the first device are instances of a same application.

12. The method of claim 4, wherein the first application data from the first application installed on the first device is more up-to-date than second application data of the second application installed on the second device if the second application data exists on the second device.

13. The method of claim 1, further comprising:
    precluding, by the first component, the first device from sending to the second device, using the wireless connection, local data stored on the first device.

14. A system, comprising:
    one or more data processing apparatus; and
    a data storage device storing instructions that, when executed by the one or more data processing apparatus, cause the one or more data processing apparatus to perform operations comprising:
    in response to a request of a first user of a first device to share first application data of a first application installed on the first device with a second device, causing, using a first component on the first device, the first device to establish a wireless connection with the second device, wherein the wireless connection is a connection that is separate from an Internet connection, wherein the first device is not communicating with the second device via the Internet connection, and wherein the second device has information about one or more applications that are installed on the second device and supported by a second component on the second device, each of the applications being separate from the second component and the first component;
    receiving, by the first component, the first application data from the first application, wherein the first application is separate from the first component and has the first application data to be shared;
    receiving, by the first component, an indication that a user of the second device has approved a data transfer; and
    causing, by the first component, the first device to send the first application data from the first application installed on the first device to the second component on the second device using the wireless connection.

15. The system of claim 14, wherein the operations further comprise:

causing, by the first component, the first device to broadcast wireless connection availability; and receiving a wireless connection request from the second device, wherein the first component causes the first device to establish the wireless connection with the second device in response to receiving the wireless connection request from the second device.

16. The system of claim 14, wherein the second device is located nearby the first device.

17. The system of claim 14, wherein the operations further comprise:

providing a user interface allowing the first user to select one or more second devices to share the first application data with.

18. The system of claim 14, wherein the first application data is to be used by a second application installed on the second device, wherein the second application corresponds to the first application.

19. A non-transitory computer readable storage medium storing instructions that, when executed by one or more data processing apparatus, cause the one or more data processing apparatus to perform operations comprising:

in response to a request of a first user of a first device to share first application data of a first application installed on the first device with a second device, causing, using a first component on the first device, the first device to establish a wireless connection with the second device, wherein the wireless connection is a connection that is separate from an Internet connection, wherein the first device is not communicating with the second device via the Internet connection, and wherein the second device has information about one or more applications that are installed on the second device and supported by a second component on the second device, each of the applications being separate from the second component and the first component;

receiving, by the first component, the first application data from the first application, wherein the first application is separate from the first component and has the first application data to be shared;

receiving, by the first component, an indication that a user of the second device has approved a data transfer; and causing, by the first component, the first device to send the first application data from the first application installed on the first device to the second component on the second device using the wireless connection.

20. The non-transitory computer readable storage medium of claim 19, wherein the operations further comprise:

providing a user interface allowing the first user to select one or more second devices to share the first application data with.

* * * * *